Feb. 16, 1960
E. A. HAYDEN
2,925,105
CHAIN SAW EQUIPPED WITH BAR STOPS
Filed Dec. 18, 1956
2 Sheets-Sheet 1
FIG. 1
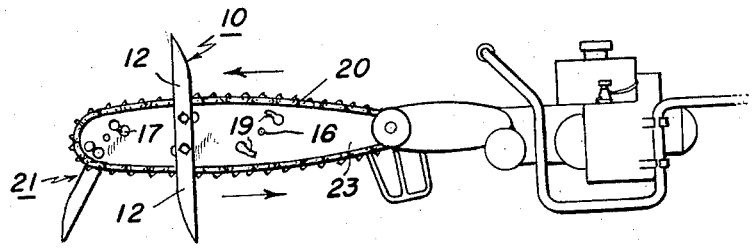
FIG. 2    FIG. 3    FIG. 4    FIG. 5
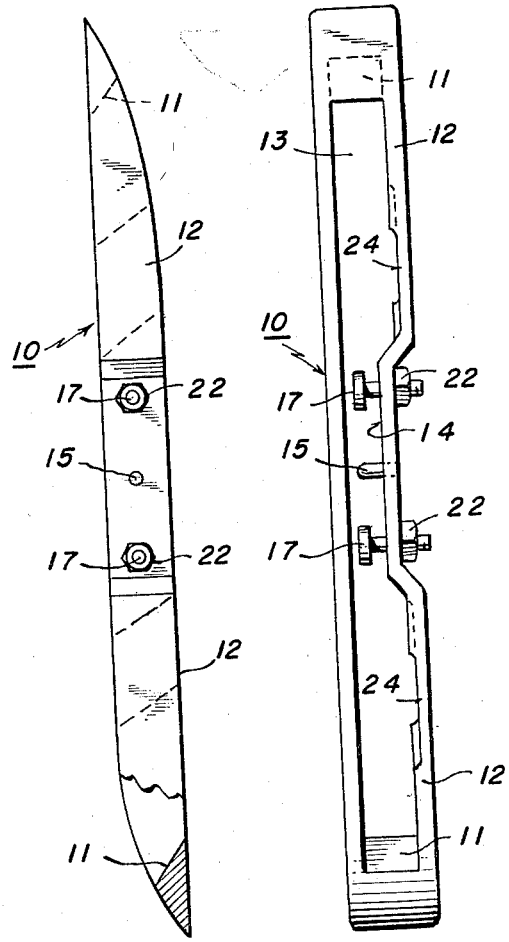 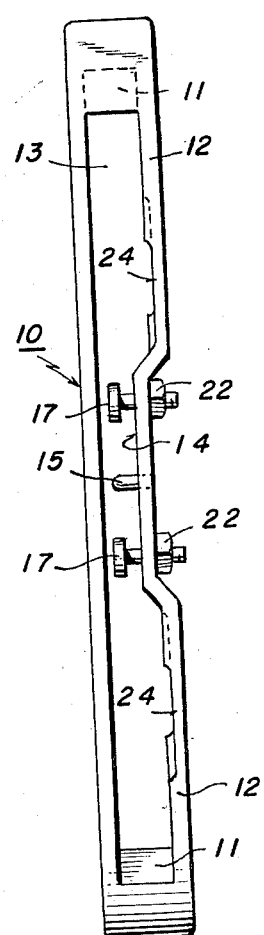 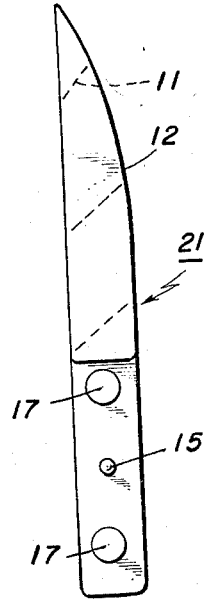 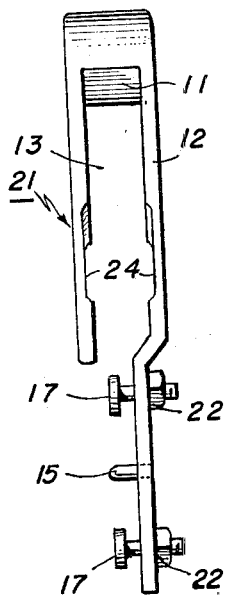
INVENTOR
ERNEST A. HAYDEN
BY
*J. B. Dickman Jr.*
ATTORNEY

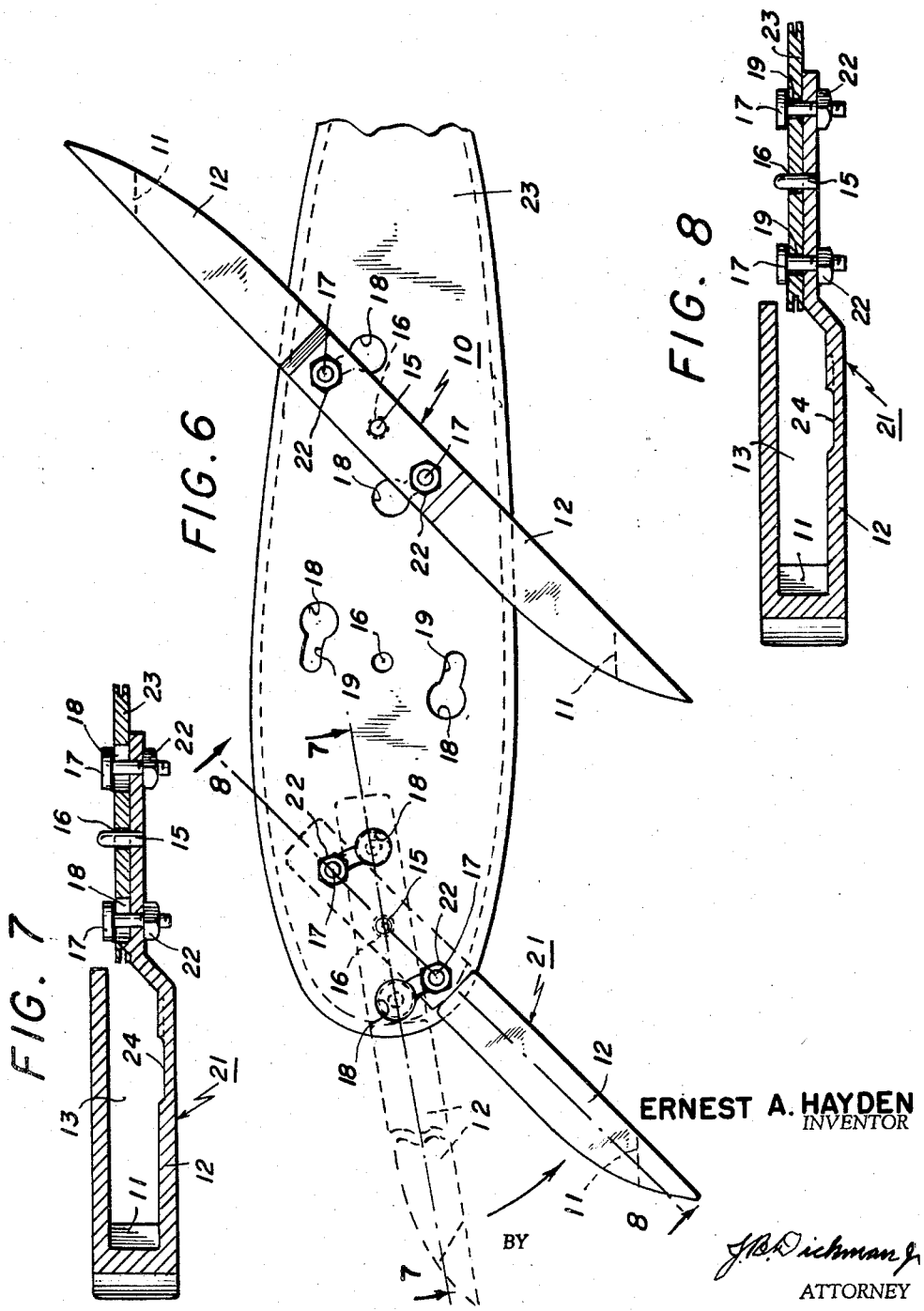

2,925,105
CHAIN SAW EQUIPPED WITH BAR STOPS

Ernest A. Hayden, Callahan, Calif.

Application December 18, 1956, Serial No. 629,169

3 Claims. (Cl. 143—32)

This invention relates to chain saw equipped with bar stops for adapting the chain saw to cut small branches and other more or less readily bendable brush-like material without grabbing.

The present invention is an improvement on the attachments for chain saws of the type disclosed in my prior Patent No. 2,642,901, issued June 23, 1953, in which the bar stops were attachable in a substantially normal position to the longitudinal axis of the saw blade, their extremities being slightly inclined in the direction of motion of the saw chain on the corresponding side of the blade. The bar stops were fixed to the blade by bolts in a prescribed angular location with respect to the saw blade which was found to be best for cutting down brush, vines etc., when the saw was swung from side to side like a double-edged scythe.

The object of the present invention is to provide means for attaching the bar stops selectively in most desirable angular positions on the saw blade with respect to the chain, for the type of cutting to be done.

Another object is to provide half bar stops for work requiring a bar stop extending only to one side of the saw blade, or outwardly from near the outer end of the saw blade.

A further object is to provide snap-on attaching means for said bar stop and cooperating receiving means therefor positioned at suitable angles and locations with respect to the saw chain on the saw blade, adapted for suitably positioning said bar stop either singly or in combination on the saw blade, as may be required for any particular type of cutting.

Other and more specific objects will become apparent in the following detailed description of the present invention as illustrated in the accompanying drawings, wherein:

Figure 1 illustrates the invention as applied to a chain saw of the conventional type having an elongated saw blade with a peripheral guide groove in its edge for the saw chain, which is driven by a motor driven sprocket at one end of the blade.

Figure 2 is a plan view of a bar stop of the double-prong type, broken away at one end to show its construction.

Figure 3 is a side view of this bar stop taken from the left in Figure 2.

Figure 4 is a bottom view of a bar stop with only one prong.

Figure 5 is a side view thereof taken from the right in Figure 4.

Figure 6 is a plan view of the saw blade with three sets of bar stop attachment receiving means at different selected positions and angular relations with respect to the blade, a double pronged bar stop mounted in one of these sets, and a single-pronged bar stop in another, and Figures 7 and 8 are sectional views taken on the lines 7—7 and 8—8 respectively of Figure 6, showing how the bar stop snap-on attachment means are operated.

The bar stops are of single and double-pronged type.

The double-pronged stop comprising a bar 10, slotted axially from side to side and having angularly cut ends 11 near the tips of the prongs 12 for a purpose to be hereinafter more fully explained.

The upper wall of the slot 13 is offset into the slot near the middle of the bar stop to provide a saw blade engaging surface 14. A pivot stud 15 is mounted in this offset portion of the upper wall extending inwardly of said slot from this surface 14 and adapted for insertion in the pivot bore 16 of the attachment receiving means in the saw blade 23, for attachment of the bar stop thereto. A pair of round headed studs 17 extend from the surface 14 at standard spacing axially of the bar stop from the pivot stud 15. The heads of these studs 17 are adapted for simultaneous insertion with the pivot studs 15, into the longer ends 18 of a pair of arcuate slots 19, comprising a part of the attachment receiving means.

After insertion of these attachment studs 15 and 17 into the pivot bore 16 and the large ends 18 of the arcuate slots 19, respectively, the bar stop is turned slightly to snap the heads of studs 17 over the narrow portions of the arcuate slots, in the direction of the pressure normally exerted on the bar stop by the material being cut, which is the same as the direction of movement of the saw chain 20 adjacent thereto.

The single-pronged stop 21 is shaped substantially like the double-pronged type except that one end portion of the bar-stop is cut off as shown in Figures 4 and 5.

The headed studs 17 in the present illustration are actually round headed bolts threaded into the offset upper wall portion, and backed in position by lock nuts 22.

The angularly cut ends of slots 13 are for accommodation of the saw blade and chain at time of insertion of the studs in a set of attachment receiving means which are mostly inclined to the blade axis such as the set shown nearest the driven end of the saw-blade illustrated here.

Relief grooves in one or both sides of the slots 13 may be provided where required opposite the moving saw chain to prevent rubbing of the chain against said sides when the bar stop is snapped on.

The saw blade may be provided with any number of sets of attachment receiving openings arranged at various angles and positions along the length of the blade, the three sets illustrated are deemed sufficient to provide for a sufficient variety of possible selections in which bar stops may be used to meet all ordinary variation in requirements for cutting material ranging in size from heavy timber down to very light brush growth. When the slots in the saw blade nearest the drive gear, as shown, are used, the bar stop is arranged for the heavier type of work. When the intermediate set is used, the bar stop is in a more suitable position for cutting brush, vines, etc. When the slots in the outer end of the blade are used, only the one-pronged bar stop can be attached, and the saw is then used for undercutting limbs, tree pruning, etc.

Many obvious modifications in the form and arrangement of the details may be made without departing from the spirit and scope of the present invention, as defined in the appended claims.

What is claimed is:

1. In a chain saw having an elongated saw blade with a peripheral guide groove in its edge for a saw chain, at least one smooth bar stop slotted to fit over said saw blade and chain and having fixed stud bolts extending inwardly of the slotted portion, said saw blade having a plurality of attachment stud receiving slots positioned in different angular relations along that longitudinal axis of said saw blade and adapted to receive said attachment stud bolts to fix the respective bar stop in any selected angular relation to said blade axis, whereby said chain saw may be adapted for different types of cutting work ranging from heavy and hard to light and soft, said attachment bolts on each bar stop comprising a pivot stud extending inwardly of said slot, and a pair of headed studs equally spaced axially of said bar stop at opposite sides of said pivot stud, said attachment stud receiving slots being supplemented at each position by a pivot bore in said saw blade and comprising a pair of arcuate slots at opposite sides of said bore, with large ends adapted to receive the heads of said headed studs in their large ends while the pivot stud is inserted into the pivot bore, for immediately snapping said bar stop into place by turning it about said pivot stud to bring said heads over the narrow ends of said arcuate slots.

2. The combination defined in claim 1, said bar stop having a smooth prong at each end extending on opposite sides of said saw blade.

3. The combination defined in claim 1, said bar stop having a prong extending only to one side of said saw blade.

References Cited in the file of this patent

UNITED STATES PATENTS

| | | |
|---|---|---|
| 1,577,856 | Wingert | Mar. 23, 1926 |
| 2,642,901 | Hayden | June 23, 1953 |
| 2,665,719 | Pennanen | Jan. 12, 1954 |
| 2,797,717 | Budd | July 2, 1957 |
| 2,821,213 | York | Jan. 28, 1958 |

FOREIGN PATENTS

| | | |
|---|---|---|
| 15,880 | Great Britain | Sept. 14, 1889 |